(12) United States Patent
Bennemann et al.

(10) Patent No.: US 11,858,313 B2
(45) Date of Patent: Jan. 2, 2024

(54) TEMPERATURE CONTROL BY CONDUCTION OF RADIATION

(71) Applicants: VOLKSWAGEN AKTIENGESELLSCHAFT, Wolfsburg (DE); AUDI AG, Ingolstadt (DE)

(72) Inventors: Mark Bennemann, Falkensee (DE); Tobias Moll, Ingolstadt (DE)

(73) Assignees: AUDI AG, Ingolstadt (DE); VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/579,101

(22) Filed: Jan. 19, 2022

(65) Prior Publication Data
US 2022/0227207 A1 Jul. 21, 2022

(30) Foreign Application Priority Data
Jan. 21, 2021 (DE) .................. 10 2021 101 210.4

(51) Int. Cl.
*B60H 1/22* (2006.01)
*F24S 20/20* (2018.01)
*B60H 1/00* (2006.01)

(52) U.S. Cl.
CPC ........... *B60H 1/22* (2013.01); *B60H 1/00278* (2013.01); *B60H 1/00295* (2019.05);
(Continued)

(58) Field of Classification Search
CPC .. B60H 1/22; B60H 1/00278; B60H 1/00295; B60H 1/00478; B60H 2001/2275;
(Continued)

(56) References Cited

U.S. PATENT DOCUMENTS

| 4,658,597 A * | 4/1987 | Shum .................... F25B 27/002 |
| | | 62/235.1 |
| 10,985,676 B2 * | 4/2021 | Choi ........................ H02N 3/00 |

(Continued)

FOREIGN PATENT DOCUMENTS

| CN | 101836053 A | * 9/2010 | ............. F03G 6/001 |
| CN | 102762965 A | * 10/2012 | ................ G01J 5/10 |

(Continued)

OTHER PUBLICATIONS

WO-2017146557-A1—machine English Translation (Year: 2022).*
German Examination Report dated May 11, 2021, from German Patent Application No. 10 2021 101 210.4 (6 pages).

*Primary Examiner* — Eric S Ruppert
*Assistant Examiner* — Kirstin U Oswald
(74) *Attorney, Agent, or Firm* — STAAS & HALSEY LLP

(57) ABSTRACT

A device for temperature control for a motor vehicle, includes a diffractive optical element disposed on a surface of the motor vehicle, and a radiator. The diffractive optical element couples in incident radiation and conducts the coupled-in incident radiation away from an area of the motor vehicle to be cooled. The radiator includes an absorber to absorb the coupled-in incident radiation which is conducted to the absorber from the diffractive optical element. The radiator releases energy based on the coupled-in incident radiation absorbed by the absorber.

15 Claims, 3 Drawing Sheets

(52) U.S. Cl.
CPC .......... B60H 1/00478 (2013.01); F24S 20/20 (2018.05); B60H 2001/2275 (2013.01)

(58) Field of Classification Search
CPC ...... B60H 2001/00235; B60H 1/00392; B60H 1/32; B60H 2001/3289; F24S 20/20; F24S 23/00
USPC .............................................................. 62/3.3
See application file for complete search history.

(56) References Cited

U.S. PATENT DOCUMENTS

| | | | | |
|---|---|---|---|---|
| 2007/0272292 | A1* | 11/2007 | Tsai | F01P 9/00 136/204 |
| 2009/0199572 | A1* | 8/2009 | Klein | B60H 1/00428 62/235.1 |
| 2010/0186818 | A1* | 7/2010 | Okorogu | H01L 31/0547 136/259 |
| 2012/0159978 | A1* | 6/2012 | Shih | B60H 1/00278 62/180 |
| 2013/0255752 | A1* | 10/2013 | Escher | F24S 23/70 136/248 |
| 2014/0060795 | A1* | 3/2014 | Yu | B60H 1/00821 454/152 |
| 2014/0144483 | A1* | 5/2014 | Jost | H01L 31/18 136/246 |
| 2018/0019503 | A1* | 1/2018 | Hinterberger | H01M 10/48 |

FOREIGN PATENT DOCUMENTS

| | | | | |
|---|---|---|---|---|
| CN | 103626126 A | * | 3/2014 | |
| DE | 10 2008 057 396 A1 | | 5/2010 | |
| DE | 10 2011 075 284 A1 | | 11/2012 | |
| DE | 10 2019 206 376 | | 3/2021 | |
| DE | 10 2021 101 210.4 | | 7/2022 | |
| GB | 2500706 A | * | 10/2013 | ............ F24S 10/502 |
| KR | 20110042884 A | * | 4/2011 | |
| WO | 2010/009490 A1 | | 1/2010 | |
| WO | WO-2014192019 A2 | * | 12/2014 | ............. B23P 15/26 |
| WO | WO-2014199394 A2 | * | 12/2014 | ................ F24J 2/02 |
| WO | WO-2017146557 A1 | * | 8/2017 | ............. F24S 21/00 |

\* cited by examiner

TEMPERATURE CONTROL BY CONDUCTION OF RADIATION

CROSS REFERENCE TO RELATED APPLICATIONS

This application claims the benefit of German Application No. 10 2021 101 210.4, filed on Jan. 21, 2021, in the German Intellectual Property Office, the disclosure of which is incorporated herein by reference in its entirety.

BACKGROUND

Described herein is a device for temperature control for a motor vehicle, a motor vehicle having the device, and a method of operation of the device.

It is known that vehicles can become warm upon solar radiation, wherefore many motor vehicles are equipped with air conditioners or air conditioning units. Air conditioning units are very energy-intensive in the operation. This in particular disadvantageously affects a range achievable with the motor vehicle. In particular in electric vehicles, the range is a great argument for or against a purchase. Modern air conditioning units require a certain start-up time until a cooling effect occurs. Thus, it is known to open the windows at the beginning of a car trip, which provides first cooling, but can increase the start-up time of the air conditioner. Further, it is sometimes usual to first start the motor vehicle and to switch on the air conditioner and to wait besides the running motor vehicle until sufficient cooling of the passenger compartment has been achieved. This method is both uncomfortable since the start of the car trip is delayed, and harmful to the environment since comparatively much fuel is used without moving the motor vehicle.

European Patent Application Publication No. 2 747 275 A2 relates to a solar collector including at least one partially transparent surface, a plane with at least one diffractive optical element, wherein the electromagnetic radiation exits through a rear side of the transparent surface opposing an incident surface with a first predetermined wavelength interval and the electromagnetic radiation exits through a lateral front surface of the transparent surface with a second predetermined wavelength interval, and at least one solar thermal unit, wherein the solar thermal unit is arranged laterally of the lateral front surface of the transparent surface, wherein the at least one photovoltaic element is arranged adjacent to the transparent surface such that electromagnetic radiation coupled out of the transparent surface irradiates it. Accordingly, this printed matter discloses a possibility of providing a solar collector, which more efficiently utilizes solar energy.

SUMMARY

One or more aspects of the disclosure are based on providing an improved and energy-efficient possibility of temperature control in a motor vehicle, for example in an occupant compartment. For example, a possibility of dimensioning an air conditioner of an electric vehicle smaller is to be provided to allow lower range losses in the operation of the air conditioner.

Described herein is a device for temperature control for a motor vehicle, including: a diffractive optical element, which is arranged on a surface of the motor vehicle, wherein the diffractive optical element is formed to couple in a part of incident radiation and to conduct it away from an area of the motor vehicle to be cooled, a radiator, which is formed to release energy, wherein the radiator includes an absorber, which is formed to absorb radiation, and the diffractive optical element is formed to conduct the coupled-in radiation onto the absorber.

Described herein is a motor vehicle with a device for temperature control as previously defined.

Finally, described herein is a method for cooling an area of a motor vehicle, for example by using a device for temperature control as previously defined, including the operations of: coupling in a part of incident radiation, conducting the coupled-in radiation away from an area of the motor vehicle to be cooled, conducting the coupled-in radiation onto an absorber, and releasing energy, for example energy of the coupled-in radiation.

By a diffractive optical element (DOE), a passive unit can be provided, which allows a temperature control for example without energy consumption. For example, particularly temperature-sensitive areas, such as an occupant compartment, can be protected from heating by irradiation. By using a radiator including an absorber, an efficient dissipation of energy for example in the form of heat can be effected. For example, the radiator can release heat to an environment or itself emit heat in the form of radiation. It is understood that the radiator can also include an electronic component, which can convert heat into electrical energy. Further, a heat pump can also be provided to accelerate the heat dissipation.

It is understood that the absorber can also be a passive component such that cooling is effected independently of energy supply. Therein, it is advantageous that cooling is effected only if cooling is required despite using passive components since the device for temperature control substantially acts due to a shielding effect. By the use of DOE, parts of the ambient radiation, for example solar radiation, can be specifically coupled in and redirected. For future motor vehicles, for example electric vehicles, it is advantageous to keep the power of the air conditioning unit as low as possible to increase the range of the electric vehicle. By specifically dissipating, thus coupling in and conducting away a part of the irradiation into the motor vehicle for example into roof surfaces, the heating of the passenger compartment can be reduced without energy expenditure.

In an example configuration, it is provided that the diffractive optical element includes a holographic optical component. Hereby, the effect of the device for temperature control can be further improved.

In an example configuration, it is provided that the device is formed to be arranged in a headliner, wherein the area to be cooled includes a passenger compartment of the motor vehicle. By an arrangement on the headliner, the efficiency of the device for temperature control can be further improved since a large surface exposed to irradiation, for example sunlight, can here be shielded by the device. Here, the passenger compartment of the motor vehicle can for example be technically simply cooled such that an air conditioning unit of the motor vehicle can be smaller dimensioned. Therein, it is particularly advantageous that the passenger compartment of the motor vehicle is already shielded even with the motor vehicle turned off, thus for example with turned off on-board electronics. The device for temperature control does not require energy and start-up time until it takes its effect.

In an example configuration, it is provided that the diffractive optical element is transparent to at least a part of the visible wavelength range of the incident radiation at least in sections. Hereby, the device for temperature control can for example replace a roof light of a motor vehicle. A comfortable shielding can be achieved without therein restricting the visibility conditions for the vehicle occupants. For example, the part, to which the diffractive optical element is transparent, can be set such that blinding of the occupants can be prevented. A comfortable device for temperature control can be provided.

In an example configuration, it is provided that the radiator includes a thermoelectric generator, wherein the diffractive optical element is formed to conduct a part of the coupled-in radiation to the thermoelectric generator, which at least partially converts the coupled-in radiation into electrical energy and releases it. Hereby, energy extraction can be effected in addition to the shielding effect. For example, the energy absorbed by the device for temperature control is not simply released to the environment, but converted for further use. Hereby, an alternator for a motor vehicle can be dimensioned smaller and lighter. Further, less power can be drawn from the drive motor by the alternator. The motor vehicle can be more efficiently operated and/or more power for drive operation can be available for the motor vehicle.

In an example configuration, it is provided that the thermoelectric generator is formed for example for pyroelectric energy generation and the diffractive optical element and the generator are matched to each other, wherein the diffractive optical element is formed to couple in radiation with a predefined wavelength, wherein the thermoelectric generator has a maximum efficiency, for example for pyroelectric energy generation, for the predefined wavelength. Hereby, energy extraction by use of the device can be further improved.

In an example configuration, it is provided that the thermoelectric generator is formed to function as a heat pump upon applying a voltage, wherein a cold side of the thermoelectric generator faces the area of the motor vehicle to be cooled. Hereby, an improved device can be provided. For example, it can be achieved that passive cooling is effected without energy effect, which can be further increased by energy expenditure as needed. In addition, the thermoelectric generator, as above described, can extract energy if it is not applied with electrical voltage.

In an example configuration, it is provided that the motor vehicle includes an electric vehicle and the device for temperature control includes a thermoelectric generator, wherein energy extracted by the thermoelectric generator is provided to a load, for example an accumulator and/or electric motor, for range increase of the electric vehicle. Hereby, the range can be increased on the one hand in that a smaller and for example energy saving air conditioning unit can be used. On the other hand, the energy converted by the thermoelectric generator can be supplied to the electric motor, the accumulator or another load to thus still further increase the range.

Further example configurations are apparent from the remaining features described herein in view of the drawings and claims.

The different embodiments described herein can be advantageously combined with each other if not otherwise explained in individual examples.

Diffractive optical elements—DOEs—are for example glass supports, onto which microstructures are for example applied by photolithography. By different optical path lengths of the partial beams, phase modulations occur in them, whereby interference patterns arise. In addition, by constructive and destructive interference, the amplitude can be modulated. In this manner, the intensity patterns in a laser beam can for example be manipulated by advantageous design. DOEs can satisfy two tasks: they can shape a laser beam or decompose it in multiple partial beams. The microstructure in the DOE can shape the beam by the refractive index or by level modulation. Further, DOEs can be used to couple in and to conduct radiation of a predefined wavelength or a predefined wavelength range in the DOE.

Holographic-optical components—HOEs—are elements, the holographic characteristics of which are for example used for optics of apparatuses. Conventional lenses, mirrors and prisms can be replaced with holograms; however, the additional holographic characteristics are often of particular advantage. The simplest holographic component is the Fresnel zone plate, which is also called a zone lens due to its characteristics. A zone lens is the hologram of a point and therefore acts as a transmission hologram at the same time as a converging lens if the real image is viewed, and diffuser lens if one proceeds from the virtual image. HOEs have special characteristics such as for example the selectivity of the color and of the angle of incidence of the light. The components can for example refract the light for a certain angle of incidence, however, they can be completely transparent to the others. The different diffraction of the light depending on its wavelength allows splitting into spectral colors like with prisms. It is possible to construct plane mirrors, concave mirrors, and convex mirrors with the aid of reflection holograms, which for example reflect the light such that the angle of incidence is different from the angle of reflection. HOEs can additionally influence other spectral ranges of the electromagnetic waves. Thereto, either the holograms are produced by exposure for example to X-radiation on a suitable film or the interference patterns of holograms selective for visible light are changed by swelling agents such that its selectivity shifts to other spectral ranges.

A thermoelectric generator or a thermocouple is a component, which can effect thermoelectricity and/or pyroelectricity. The mutual influence of temperature and electricity and their conversion into each other is understood by thermoelectricity. The Seebeck effect (also thermoelectric effect), the Peltier effect, and the Thomson effect each describe a reversible interaction between the two physical quantities. Pyroelectricity is the characteristic of some piezoelectric crystals to react to a temperature change $\Delta T$ (Delta T) with charge separation.

BRIEF DESCRIPTION OF THE DRAWINGS

These and other aspects and advantages will become more apparent and more readily appreciated from the following description of example embodiments, taken in conjunction with the accompanying drawings of which.

DETAILED DESCRIPTION

Figure 1:
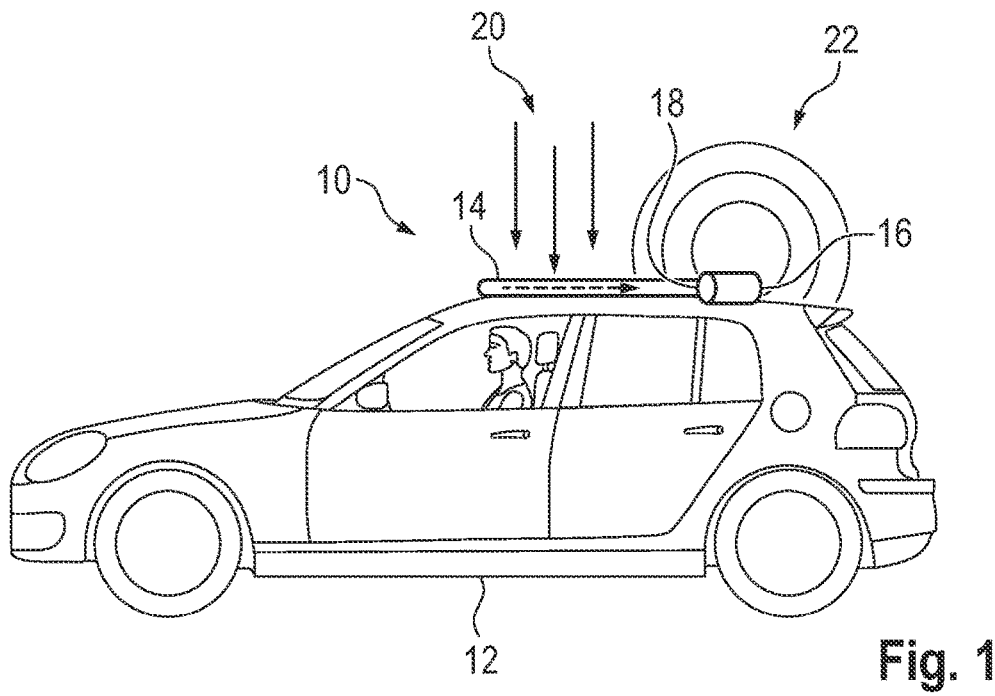
FIG. 1 is a schematic representation of a motor vehicle with a device for temperature control.

Reference will now be made in detail to example embodiments which are illustrated in the accompanying drawings, wherein like reference numerals refer to like elements throughout.

FIG. 1 schematically shows a device 10 for temperature control. In the shown example, the device 10 is arranged in a headliner of a motor vehicle 12.

For temperature control, the device 10 includes a diffractive optical element 14 and a radiator 16. The diffractive optical element 14 is arranged adjacent to the radiator 16. The radiator 16 includes an absorber 18 on its side facing the diffractive optical element 14. The diffractive optical element 14 is formed to couple partial radiation illustrated by a dashed arrow out of incident radiation 20, for example the solar radiation, which is illustrated by solid arrows.

The absorber 18 is formed to absorb the partial radiation, which is conducted towards the radiator 16 by the diffractive optical element 14 and to release the energy absorbed from the partial radiation to the radiator 16. For example, the absorber 18 can heat in reaction to an absorption of the partial radiation, wherein it transfers the heat to the radiator 16. The radiator 16 can then irradiate the heat or release it to the environment, which is illustrated in FIG. 1 by three concentric partial circles 22.

For example, the diffractive optical element 14 is transparent to a visible part of the solar radiation such that the diffractive optical element 14 is perceived like a roof light by a vehicle occupant. For example, the radiator 16 and the absorber 18 are arranged covered in the body to provide an optically appealing impression in the vehicle interior for the occupant.

Figure 2:
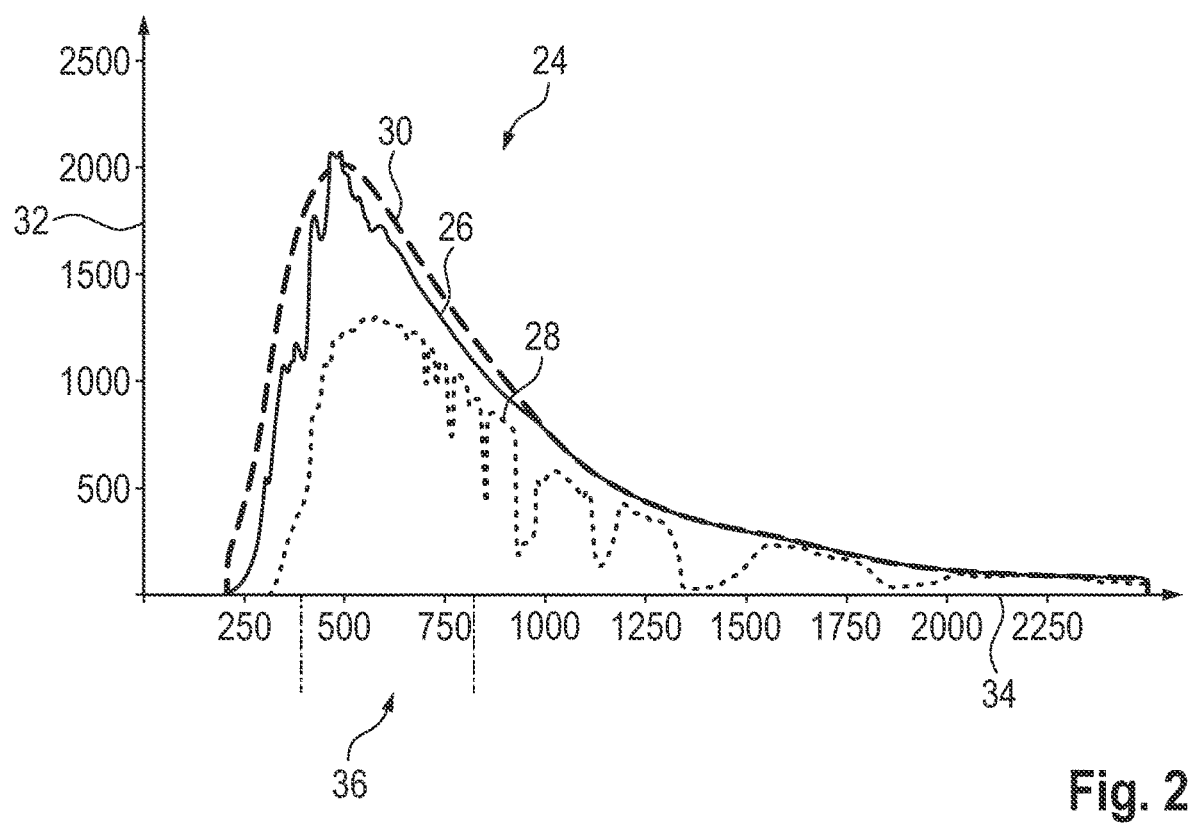
FIG. 2 schematically illustrates a spectrum of the intensity of the solar radiation compared to the emission of an ideal black body.

In FIG. 2, a diagram 24 of different radiation intensities is schematically illustrated for better comprehension. An intensity of the solar radiation is illustrated at AM0 26, thus in the space close to earth, as a solid line. An intensity of the solar radiation is illustrated at AM1.5 28 as a dotted line, this approximately corresponds to a solar intensity at the apex of the sun's motion in Karlsruhe. For comparison, the emission of an ideal black body 30 at a temperature of 5900 K is illustrated as a dashed line. AM denotes the air mass and comes from the English Air Mass, briefly AM. In astronomy, it is a relative measure for the length of the path, which the light of a celestial body travels through the Earth's atmosphere to the ground or to the observing observatory. This light path influences the scattering and absorption of the starlight and also its spectral composition.

On the ordinate 32 or Y-axis, the radiation intensity is plotted in W/(m2 µm) (watts per square meters by micrometers), wherein the distance between two marks on the Y-axis corresponds to 500 units.

On the abscissa 34 or X-axis, the wavelength is plotted in nm (nanometers), wherein the distance between two marks on the X-axis corresponds to 250 units. Further, the wavelength range 36 visible for the human is marked with two perpendicular dotted-dashed lines.

The declines of the intensity of the solar radiation at AM1.5 28 have their cause for example in absorption effects of the Earth's atmosphere. It is clearly apparent that the visible wavelength range 36 constitutes a part of the radiation of the sun such that a good shielding can be achieved without substantially obstructing the sight. For example, it is possible to also shield a part of the visible wavelength range 36 and still allow maintaining a sufficiently good sight.

Figure 3:
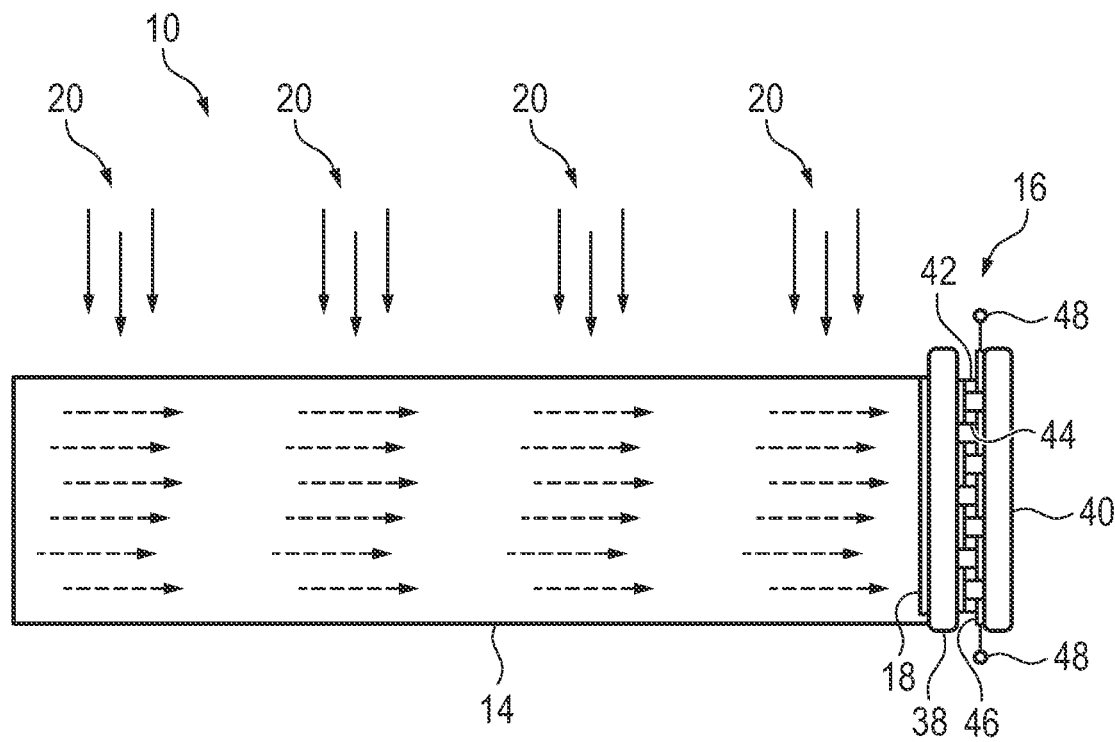
FIG. 3 schematically illustrates a device for temperature control with a thermoelectric generator.

In FIG. 3, a device 10 for temperature control with a radiator 16 in the form of a thermoelectric generator is schematically illustrated. Identical reference characters relate to identical features and are not again explained.

A thermoelectric generator, also known as TE generator, is a unit, which can extract electrical energy from heat. Different from usual thermal engines, a thermoelectric generator does not include any movable parts. Hereby, it is particularly robust and fail-safe.

The thermoelectric generator is based on the thermoelectric effect, also known as Seebeck effect, in semiconductors. Herein, two differently doped versions of a semiconductor material with Seebeck coefficient as high as possible arranged between a first ceramic layer 38 and a second ceramic layer 40 are preferably used. In the shown example, the first ceramic layer 38 is coated with the absorber 18 at least in sections and heats, as above described, by absorption of the partial radiation.

The TE generator includes multiple differently doped semiconductor materials, which are denoted by 42 for n-doped semiconductors and by 44 for p-doped semiconductors in FIG. 3. The semiconductors 42, 44 are connected to each other via metallic electrical contacts 46. If the temperature of the first ceramic layer 38 and the second ceramic layer 40 differs, an electrical voltage arises between the current connections 48. Therein, a heat flow from the hot to the cold side occurs, which is driven by the mentioned temperature difference.

The electrical voltage achieved with a TE generator depends on the used temperature difference, the selection of the thermoelectric materials (TE materials) and the number of the elements as in the shown series connection. For example, it can be several volts. In order to be able to withdraw the maximum electrical power, the electrical current intensity is for example selected as high as the generated voltage is considerably reduced. Such an energy conversion is also known as thermovoltaic.

It is understood that the TE generator can also be a pyroelectric generator. Herein, charge separation for example occurs by a temporal temperature change of a material of the pyroelectric generator, for example by supplied and absorbed partial radiation. Therein, different potentials arise on opposing surfaces of the material such that an electrical voltage can be tapped.

Figure 4:
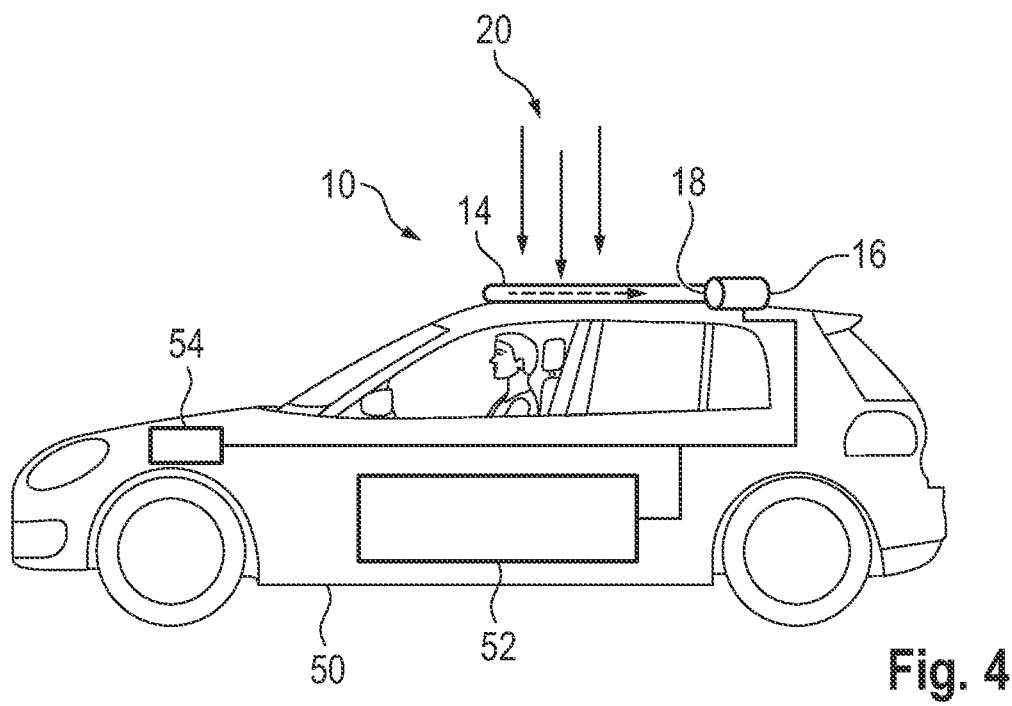
FIG. 4 schematically illustrates an electric vehicle with a device for temperature control with a thermoelectric generator.

FIG. 4 schematically shows a device 10 for temperature control with a TE generator, which is arranged in a headliner of an electric vehicle 50.

The energy converted from the partial radiation by use of the TE generator can be used for increasing a range of the electric vehicle 50 and for example be stored in the accumulator 52 or a vehicle battery to be provided to an electric motor 54 as needed to generate drive power.

It is understood that the converted energy can also be directly supplied to the electric motor 54 such that it obtains less energy from the energy stock of the accumulator 52.

Further, it is understood that the converted energy can also be provided to other loads in the electric vehicle 50, for example to an air conditioning unit not shown.

Figure 5:
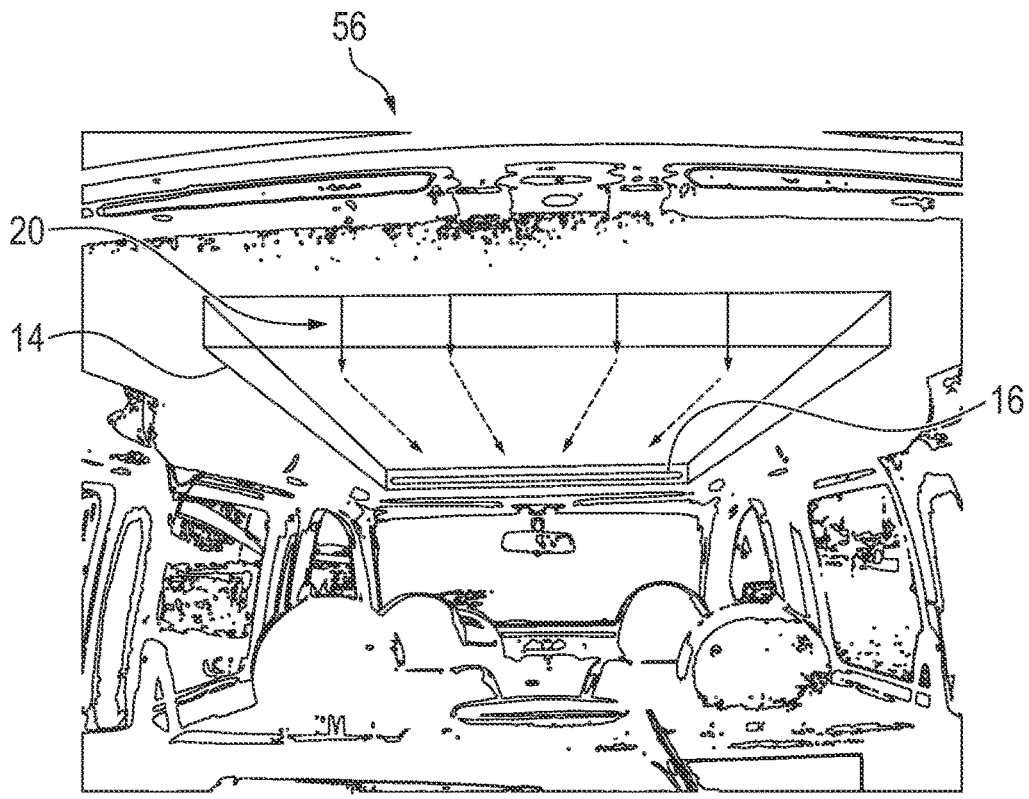
FIG. 5 schematically illustrates a field of view of an occupant in a motor vehicle with a device for temperature control in the headliner.

In FIG. 5, a field of view 56 of an occupant in a motor vehicle 12 with a device 10 for temperature control in the headliner is schematically illustrated. The device 10 can be integrated in the motor vehicle 12 in an inconspicuous manner for the occupant. For example, the impression of a roof light can be induced such that the device 10 does not include optical disadvantages for the occupant. An occupant finds a usual view in the motor vehicle 12. Therein, it is particularly advantageous that sufficient installation space is present for integration of the device 10 since only a few additional components or units are provided in the headliner of a motor vehicle 10.

Figure 6:
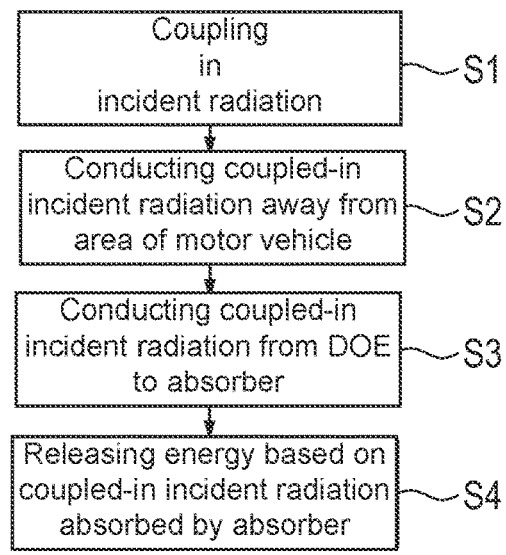
FIG. 6 schematically illustrates the operations of a method according to examples described herein.

In FIG. 6, the operations of a method described herein are schematically shown. For example, the method is performed with a device 10 for temperature control as described herein in detail. In a first operation 51, coupling in a part of incident radiation 20, for example of incident solar radiation, is effected wherein a partial radiation is coupled out of the solar radiation by use of a diffractive optical element 14 and coupled into the diffractive optical element 14. Thereupon, in an operation S2, conducting the coupled-in radiation from an area of the motor vehicle 12 to be cooled is effected. The area of the motor vehicle 12 to be cooled for example includes an interior, for example a passenger compartment of the motor vehicle 12. In a further operation S3, finally, conducting the coupled-in radiation onto a radiator 16, for example an absorber 18 of the radiator 16, is effected. Finally, in an operation S4, releasing energy, for example energy of the coupled-in radiation, is effected for example by use of the radiator 16 and for example by use of a TE generator.

A novel system approach for the use of DOEs and in particular HOEs is proposed. According to the example embodiments described herein, at least the following advantages can be achieved.

For example, a range increase by current generation from ambient radiation, for example solar radiation, and use of the IR portion, thus the thermal radiation, can be achieved with the disclosed teachings.

For example, a hidden functionality can be achieved with transparent surfaces. By a specific spectral design of the DOE, a pyroelectric energy generation can be effected.

Further, a reduction of the required air conditioning power can be achieved by dissipating thermal radiation in the passenger compartment.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in *Superguide* v. *DIRECTV*, 358 F3d 870, 69 USPQ2d 1865 (Fed. Cir. 2004). That is the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C. In addition, the term "and/or" includes a plurality of combinations of relevant items or any one item among a plurality of relevant items. That is, the scope of the expression or phrase "A and/or B" includes all of the following: (1) the item "A", (2) the item "B", and (3) the combination of items "A and B".

What is claimed is:

1. A device for temperature control for a motor vehicle, comprising:
    a diffractive optical element disposed on a surface of the motor vehicle, the diffractive optical element configured to,
        be transparent to at least a first part of a visible wavelength range of incident radiation in a section on the surface of the motor vehicle to induce light,
        couple in the incident radiation as coupled-in incident radiation, and
        conduct at least a second part of a wavelength range of the coupled-in incident radiation away from an area of the motor vehicle to be cooled; and
    a radiator including an absorber configured to absorb the coupled-in incident radiation which is conducted to the absorber from the diffractive optical element,
        the radiator configured to release energy based on the coupled-in incident radiation absorbed by the absorber,
        the radiator includes a thermoelectric generator, and
        the diffractive optical element is configured to conduct the second part of the wavelength range of the coupled-in incident radiation to the thermoelectric generator.

2. The device according to claim 1, wherein the diffractive optical element includes a holographic optical component.

3. The device according to claim 1, wherein
    the device is disposed in a headliner, and
    the area to be cooled includes a passenger compartment of the motor vehicle.

4. The device according to claim 1, wherein
    the thermoelectric generator is configured to convert at least part of the second part of the wavelength range of the coupled-in incident radiation into electrical energy and release the electrical energy.

5. The device according to claim 4, wherein
    the thermoelectric generator is configured to generate pyroelectric energy,
    the diffractive optical element and the thermoelectric generator are matched to each other such that the diffractive optical element is configured to couple in incident radiation having a predefined wavelength, and
    the thermoelectric generator has a maximum efficiency with respect to the predefined wavelength for pyroelectric energy generation.

6. The device according to claim 4, wherein
    the thermoelectric generator is configured to function as a heat pump in response to a voltage being applied, and
    a cold side of the thermoelectric generator faces the area of the motor vehicle to be cooled.

7. A motor vehicle, comprising:
    a chassis; and
    a device to control a temperature of the motor vehicle, the device including:
        a diffractive optical element disposed on a surface of the motor vehicle, the diffractive optical element configured to,
            be transparent to at least a first part of a visible wavelength range of incident radiation in a section on the surface of the motor vehicle to induce light,
            couple in the incident radiation as coupled-in incident radiation, and
            conduct at least a second part of a wavelength range of the coupled-in incident radiation away from an area of the motor vehicle to be cooled; and
        a radiator including an absorber configured to absorb the coupled-in incident radiation which is conducted to the absorber from the diffractive optical element,
            the radiator configured to release energy based on the coupled-in incident radiation absorbed by the absorber,
            the radiator includes a thermoelectric generator, and
            the diffractive optical element is configured to conduct the second part of the wavelength range of the coupled-in incident radiation to the thermoelectric generator.

8. The motor vehicle according to claim 7, wherein the diffractive optical element includes a holographic optical component.

9. The motor vehicle according to claim 7, further comprising:
a headliner; and
a passenger compartment,
wherein
the device is disposed in the headliner, and
the area to be cooled includes the passenger compartment.

10. The motor vehicle according to claim 7, wherein
the thermoelectric generator is configured to convert at least part of the second part of the wavelength range of the coupled-in incident radiation into electrical energy and release the electrical energy.

11. The motor vehicle according to claim 10, wherein
the thermoelectric generator is configured to generate pyroelectric energy,
the diffractive optical element and the thermoelectric generator are matched to each other such that the diffractive optical element is configured to couple in incident radiation having a predefined wavelength, and
the thermoelectric generator has a maximum efficiency with respect to the predefined wavelength for pyroelectric energy generation.

12. The motor vehicle according to claim 10, wherein
the thermoelectric generator is configured to function as a heat pump in response to a voltage being applied, and
a cold side of the thermoelectric generator faces the area of the motor vehicle to be cooled.

13. The motor vehicle according to claim 10, wherein
the motor vehicle is an electric vehicle, and
the electrical energy released by the thermoelectric generator is provided to a load to increase a range of the electric vehicle.

14. The motor vehicle according to claim 13, wherein the load is an accumulator and/or an electric motor of the electric vehicle.

15. A method for cooling an area of a motor vehicle, comprising:
coupling in incident radiation as coupled-in incident radiation, by a diffractive optical element disposed on a surface of the motor vehicle, the diffractive optical element configured to,
be transparent to at least a first part of a visible wavelength range of incident radiation in a section on the surface of the motor vehicle to induce light,
couple in the incident radiation, and
conduct at least a second part of a wavelength range of the coupled-in incident radiation away from an area of the motor vehicle to be cooled;
conducting the coupled-in incident radiation away from the area of the motor vehicle to be cooled;
conducting the coupled-in incident radiation from the diffractive optical element to an absorber of a radiator of the motor vehicle;
converting, by a thermoelectric generator included in the radiator, at least part of the coupled-in incident radiation into electrical energy; and
releasing the electrical energy, by the radiator.

* * * * *